ial section through the gear shift-lever, showing plunger bolt and operating mechanism.

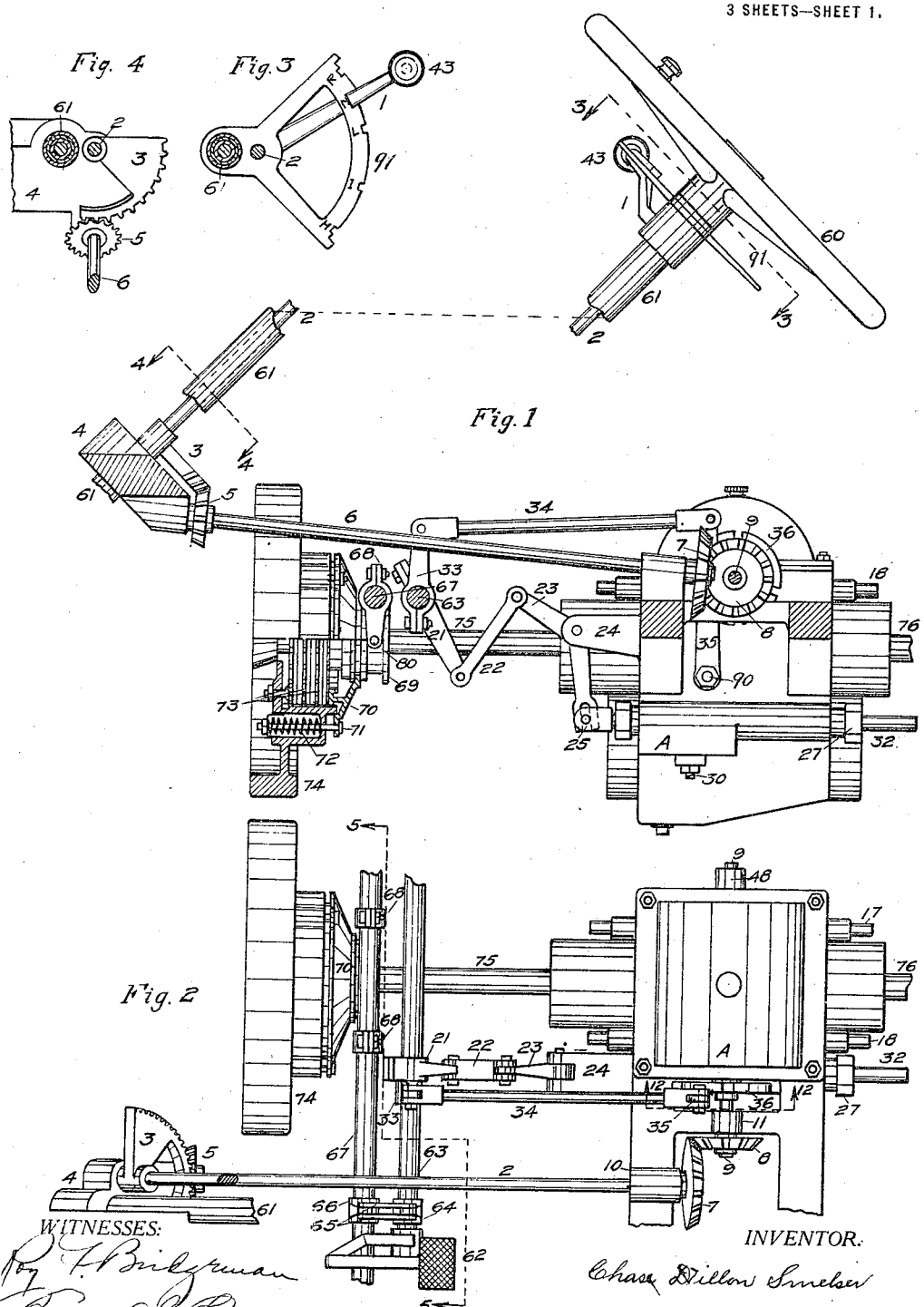

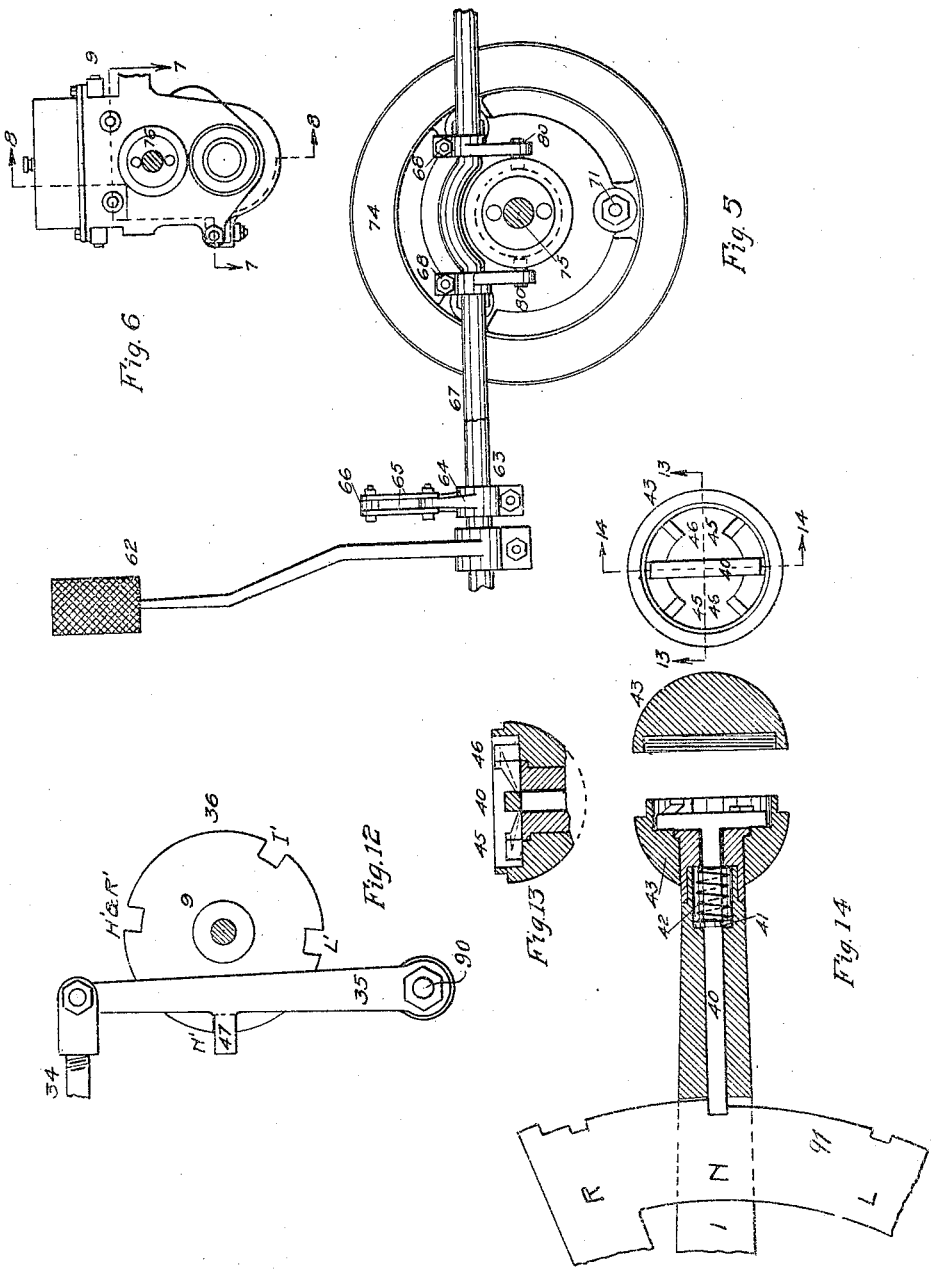

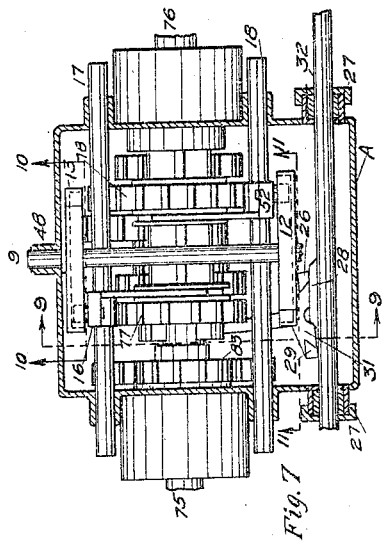
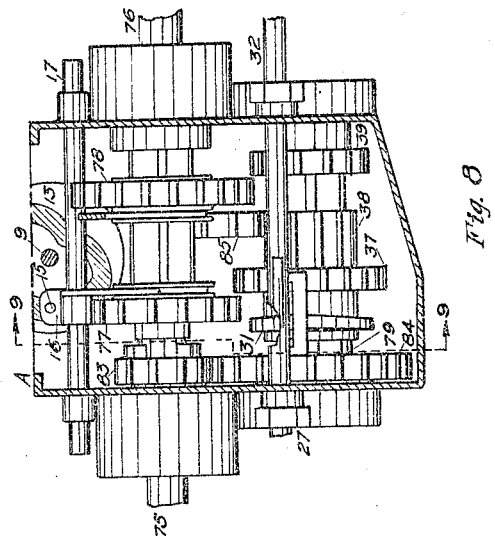
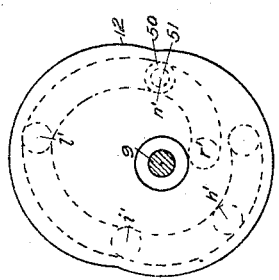
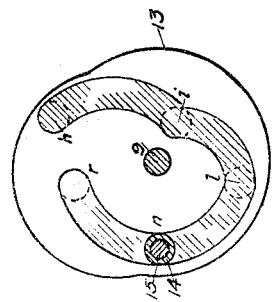
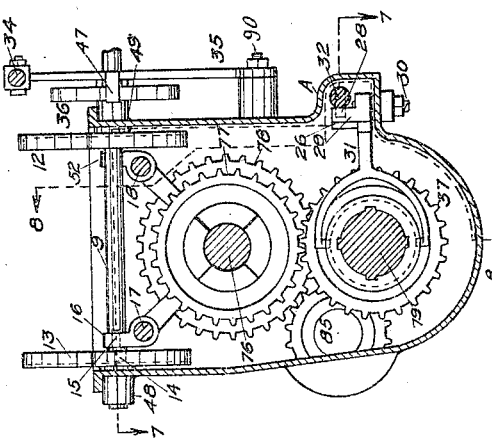

UNITED STATES PATENT OFFICE.

CHASE DILLON SMELSER, OF PLYMOUTH, INDIANA.

AUTOMOBILE POWER-TRANSMISSION-GEAR-SHIFT DEVICE.

1,237,713.  Specification of Letters Patent.  Patented Aug. 21, 1917.

Application filed September 13, 1915. Serial No. 50,498.

*To all whom it may concern:*

Be it known that I, CHASE DILLON SMELSER, a citizen of the United States, residing at Plymouth, in the county of Marshall and State of Indiana, have invented a new and useful Automobile Power-Transmission-Gear-Shift Device, of which the following is a specification.

The object of my invention is, to provide means for changing gears of an automobile by the swing of a lever mounted on the steering post to some predetermined position, which selects the different speed gears thereof, and, to provide means for preventing the shifting of the selective gears while the clutch is engaged and to prevent the engagement of the clutch if the selected gear is not shifted into its proper position of mesh, or into its proper neutral position.

Referring to the drawings: Figure 1 is a side view of the steering wheel, transmission housing, clutch and fly-wheel (showing half-section through each), with my invention applied thereto; Fig. 2 is a top view of the transmission housing, clutch and fly-wheel, with the steering wheel and gear shift lever removed, and my invention applied thereto; Fig. 3 is a section taken on line 3—3 Fig. 1, showing the gear shift lever and the graduated quadrant for the various speeds; Fig. 4 is a section taken on line 4—4, Fig. 1, showing the bevel gears of the gear shift mechanism; Fig. 5 is an end view of the clutch and fly-wheel, taken on line 5—5, Fig. 1; Fig. 6 is an end view of the transmission housing; Fig. 7 is a horizontal detail section, taken on line 7—7 Figs. 9 and 6, showing selective cams 12 and 13, drag rods 17 and 18, shift-rod 32 and the transmission gears 83, 84, 85, 37, 77, 78, 38 and 39, all of which are in their normal position; Fig. 8 is a vertical detail section taken on line 8—8, Figs. 6 and 9, showing transmission gears and shifting mechanism, all in their normal position; Fig. 9 is a vertical detail section through the transmission, taken on line 9—9, Figs. 7 and 8; Fig. 10 is a vertical view of selective cam 13, taken on line 10—10, Fig. 7; Fig. 11 is a vertical view of the back of selective cam 12, taken on line 11—11, Fig. 7, (dotted lines shows the eccentric groove in other side); Fig. 12 is a vertical view of the notched disk and lock arm, taken on line 12—12, Fig. 2; Fig. 13 is a detail section through part of hand-ball, taken on line 13—13, Fig. 14, showing T-head of plunger and operating wedges 45 and 46; Fig. 14 is a detail section through the gear shift-lever, showing plunger bolt and operating mechanism.

In a detail description of my invention, 1 designates a lever keyed on shaft 2 which is journaled in the frame of the graduated quadrant 91 attached to the steering post or column 61 which is secured to the body of an automobile. Lever 1 can be swung up or down along the graduated quadrant 91 in the face of which are notches R, N, L, I, and H, that correspond respectively to the reverse, neutral, low, intermediate, and high speed positions of the transmission gearing. Plunger 40 engages in these notches as operated.

By rotating hand-ball 43 on lever 1 clockwise, Fig. 14, wedges 45 rotate under T-head of plunger 40; thereby shifting said plunger which disengages the lock end from any of the notches N, L, I, or H, so as to permit lever 1 to be swung into any of the positions N, L, I, or H, as desired. By rotating hand-ball 43 in the opposite direction, wedges 46 rotate under T-head of plunger 40, thereby shifting said plunger which disengages the lock end from any of the notches N, L, I, or H, so as to permit lever 1 to be swung into or out of the reverse position R. Thus by rotating hand-ball 43 clockwise, lever 1 can be swung from any of the positions L, I, or H, into N without the operator guarding against the over throw into R, since the lock end of plunger 40, strikes the high side of notch N. Coil spring 42 acting against collar 41 on plunger 40, forces the lock end of plunger 40 to engage any of the notches R, H, L, I, or H, as selected.

Shaft 2 is journaled at its lower end in a suitable bearing secured to bracket 4 which carries the lower end of the steering post. Keyed on shaft 2 is a segmental bevel gear 3 which meshes with a bevel gear 5 keyed on a horizontal shaft 6 journaled at its forward end in a bearing secured to bracket 4 attached to the frame of the automobile. The rear portion of shaft 6 is journaled in a suitable bearing 10 secured in a bracket carrying the transmission housing. Keyed on the rear end of shaft 6 is a bevel gear 7 which meshes with a similar gear 8, keyed to horizontal shaft 9 journaled in bearing 11, 48 and 49; the former bearing 11 is secured in a bracket carrying the transmission housing; the latter bearings 48 and 49 are secured in the transmission housing A. Keyed on shaft 9 just outside the transmission housing is disk 36 in the face of which are notches N', L', I', and H'—R'; that correspond respectively to the neutral, low, intermediate, high, and reverse speeds of the transmission. Keyed on shaft 9 inside the transmission housing are selective cams 12 and 13, having eccentric grooves $r$, $n$, $l$, $i$, $h$, and $r'$, $n'$, $l'$, $i'$, $h'$ respectively.

Referring to Fig. 1, 73 are disks of a friction disk clutch which are keyed alternately to a shaft from the motor (not shown) and shaft 75. The disks 73 are held normally in contact (or the clutch in engagement) by coil springs 72 acting on clutch member 70, and is disengaged therefrom by an arm 68 carrying a pin which rests in the grooved periphery of hub 69 of clutch member 70. Said arm 68 is mounted on shaft 67 suitably journaled in the frame of the automobile. Fast on shaft 67 is arm 66 connected by member 65 to arm 64 fast on clutch pedal shaft 63 carrying foot pedal 62; said shaft being suitably journaled in the frame of the automobile.

When the clutch is engaged the motor (not shown) is thereby coupled directly to shaft 75 having thereon the pinion 83 in mesh with gear 84 in counter-shaft 79, carrying gears 37, 38 and 39 connected at their hubs and keyed to shaft 79 for axial movement thereon. Gears 37 and 39 are for intermediate and slow speeds forward; the pinion 38 in mesh with the intermediate gear 85 is for reverse travel when the gear 78 keyed to shaft 76 for axial movement thereon is thrown in mesh therewith. Gear 78 thrown rearward engages with gear 39 for slow speed forward. Gear 77 keyed on shaft 76 for axial movement, thrown rearward in mesh with gear 37 gives intermediate speed forward. Gear 77 thrown forward directly connects shaft 75 to shaft 76 for high speed forward.

Each gear 77 and 78 is provided with a hub, having a grooved periphery. Shift-yokes 16 and 52 engage the grooved hubs of gears 77 and 78 respectively. Shift-yokes 16 and 52 are secured to drag-rods 17 and 18 respectively, said drag-rods having longitudinal movement and secured in suitable bearings near each end in the transmission housing A. Secured in the end of shift-yoke 16 near drag-rod 17 is bearing pin 15 carrying a roller 14 engaged and traveled in the eccentric groove of cam 13. Likewise secured in the end of shift-yoke 52 near drag-rod 18 is bearing pin 52 carrying a roller 50 engaged and traveled in the eccentric groove of cam 12.

Thus; from the above description lever 1 secured on shaft 2 rotates shaft 6 which rotates shaft 9, thereby rotating cams 12 and 13 Figs. 10 and 11, which actuate gears 78 and 77 respectively, as follows;—assuming a neutral position of the gears and noting the relative position of the eccentricity of the grooves in cams 12 and 13 respectively:—to select a reverse speed; gear 78 is shifted forward to mesh with gear 85. From neutral; to select slow speed, gear 78 is shifted rearward to mesh with gear 39; from slow speed to select intermediate speed gear 78 is shifted forward to neutral, while gear 77 is shifted rearward to mesh with gear 37; from intermediate speed to select high speed, gear 77 is shifted forward to engage the jaws of said gear 77 with the jaws in the hub of gear 83, thereby coupling shaft 75 directly with shaft 76.

Referring to Figs. 1, 2, 7, and 8, fast in shaft 63 is an arm 21 connected by connecting rod 22 to bell-crank 23 secured in bracket 24. The lower U shaped end of said bell-crank 23 straddles a pin secured in a block 25 fast on shift-rod 32 having longitudinal movement. Said shift-rod 32 passes through the transmission housing A and is secured at each end for longitudinal movement in packed bearings 27 in the transmission housing. Said shift-rod 32 carries a rectangular member 28 wedged at each end; said member 28 when shifted contacts one of the vertical projecting lugs 29 or 26 on opposite ends of the T-head of rocker-yoke 31: said rocker-yoke 31 is pivoted at its T-head intersection by a bearing pin 30 secured in the transmission housing. The leg or stem end of said rocker-yoke 31 is yoked so as to engage the grooved periphery in the hub of the connected gears 37, 38 and 39. Thereby when said shift-rod 32 is moved longitudinally, member 28 acting on lug 26 or 29 rocks the rocker-yoke 31 which shifts the connected gears 37, 38 and 39 as said rocker-yoke is actuated. The rearward shift of said gear 37, 38 and 39 takes place immediately after the clutch is disengaged and the shift of said gears to their normal position takes place immediately before the clutch engages. Thus when the clutch is disengaged the selective gears 77 and 78 can be shifted to any position or from their high or intermediate speed positions to neutral without meshing with their respective or corresponding gear.

Mounted on clutch-pedal shaft 63 is an arm 33 connected by connecting rod 34 to the upper end of lock-arm 35 pivoted at its lower end by bearing pin 90 secured in the transmission housing. Attached to arm 35 is lug 47 adapted to engage the notches N', L', I', or H'—R', in the face of disk 36, accordingly; when the shaft 9 is rotated to select a certain selective gear, the disk 36 is rotated to bring into position a notch to be engaged by lug 47 on arm 35, said notch corresponding to the selected gear.

Arm 35 being operated in conjunction with the aforesaid clutch, the throw of said arm 35 is so adjusted that lug 47 on said arm does not disengage any of the notches in face of disk 36 until the clutch is released, and gears 37 38 and 39 have been shifted rearward as previously described. Thus the selective gears 77 and 78 shifted by means from lever 1, can not be shifted until the clutch is disengaged and the gears 37, 38, and 39 have been shifted rearward. Lug 47 on arm 35 coming in contact with the face of disk 36 will prevent the engagement of the aforesaid clutch and the shift of gears 37, 38 and 39 to their normal position, until the proper execution of the selected gears has been made, which brings the proper notch in face of disk 36 in position to be engaged by lug 47 on arm 35.

To illustrate my invention by a specific example; it is desired to select the first or slow speed forward. The transmission being neutral, foot pressure is first applied to foot-pedal 62 which throws out the clutch; shifts the gears 37, 38 and 39 on the countershaft 76 rearward, and disengages lug 47 on arm 35 from the notch N' in disk 36, thence ball 43 on lever 1 Fig. 14 is rotated clockwise, which disengages plunger 40 from notch H thereby allowing lever 1 to be swung downward; in the meantime the grip is released on ball 43 which permits plunger 40 to engage in notch L. Thus lever 1 has rotated shaft 2 which rotates shaft 9 by means of shaft 6, sufficiently, to bring notch L' in face of disk 36 on shaft 9, in position to be engaged by lug 47 on arm 35; said notch L' corresponding to the selected position of lever 1. Likewise cam 12 rotates sufficiently so that the groove at l' has assumed the position on the same horizontal line as n'; thus roller 50 engaged and traveled in the eccentric groove n'—l' in cam 12, and mounted on bearing pin 51 secured in shift-yoke 52 adapted to shift gear 78 rearward, shifts said gear 78 a sufficient distance to mesh with gear 39, when said gear 39 is in its normal position. Cam 13 rotates likewise as cam 12; but since there is no eccentricity in the groove n—l for this selection, gear 77 remains normal.

When lever 1 is swung to its selected position L, pressure is released from foot-pedal 62; gears 37, 38 and 39 shift to their normal position which brings gear 39 in mesh with gear 78; thence lug 47 on arm 35 immediately engages notch L' on disk 36; and thence the clutch immediately engages which connects shaft 75 to the motor. On shaft 75 is pinion 83 in mesh with gear 84 on counter-shaft 79 which rotates gear 39 in mesh with gear 78 on driving shaft 76; thus giving slow speed forward. Any other speed can be selected in a similar manner.

I claim for my invention and desire to secure by Letters Patent the following:

1. In an automobile transmission gear-shift mechanism, the combination of a gear transmission, a clutch between the transmission and a source of power, a spring normally holding the clutch members in engagement, a shaft and a hand-controlled member adapted to rotate said shaft, a plurality of selecting cams on said shaft, a drag rod actuated by each cam, a shift yoke carried by said rod adapted to shift a corresponding selective gear, a locking member carried by said shaft, and coöperating devices operatively connected with said clutch adapted to prevent rotation of said shaft, when the clutch is engaged, a countershaft, and a clutch pedal-controlled member, said gear transmission comprising a system of gears actuated by said last named member and axially movable on the countershaft, the last-named gears being moved out of mesh with their coöperating gears when the clutch is disengaged.

2. In an automobile transmission gear shift mechanism, the combination of a gear transmission, a clutch between the transmission and a source of power, a spring normally holding the clutch members in engagement, a shaft and a plurality of selecting cams thereon, said cams having eccentric grooves in their sides, a hand-controlled member adapted to assume different positions and to rotate said shaft, shift yokes having bearing pins provided with rollers adapted to travel in the grooves of said cams, longitudinally movable rods on which the shift yokes are supported, said transmission comprising axially movable gears having grooved hubs, each of said shift yokes adapted to engage a groove in the hub of an axially movable gear.

3. In an automobile transmission gear shift mechanism, the combination of a gear transmission, a clutch between the transmission and a source of power, a spring normally holding the clutch members in engagement, a hand-controlled member adapted to assume different positions, a shaft rotated by said member, a plurality of selecting cams on said shaft, said transmission comprising a corresponding series of gears actuated by said cams, each cam adapted to shift a corresponding gear, a disk carried by said shaft and having notches in the face thereof corresponding to the different positions of the hand-controlled member, an arm adapted to engage the notches in the face of said disk, a clutch pedal shaft, and means connecting the clutch pedal shaft with said arm to move the latter into engagement with said shaft to prevent the selective gears from being shifted when the clutch is engaged and to allow said selective gears to be shifted when the clutch is disengaged, and to prevent the engagment of said clutch if the selective gears are not shifted to a position for proper mesh or disengagement.

4. In an automobile transmission gear shift mechanism, the combination of a gear transmission, a housing therefor, a clutch between the transmission and a source of power, a clutch pedal shaft operatively connected to the clutch, a spring normally holding the clutch member in engagement, a shaft, a hand-controlled member adapted to rotate said shaft, a plurality of selecting cams on the shaft, each of said cams adapted to shift a corresponding gear, a locking means and a coöperating mechanism actuated by the clutch pedal shaft, adapted to render the cam shaft inoperative when the clutch is engaged, a bell crank, said clutch pedal shaft being connected with said bell crank, a longitudinally movable rod shiftable by the bell crank, said rod passing through the transmission housing, a rectangular member having wedge-shaped ends and secured to said rod, two vertical members, said rectangular member adapted to actuate one of said two vertical members at a time, each member being opposite and in the path of said rectangular member, a rocker yoke having a T-head and said yoke being pivoted at its T-head intersection, a countershaft, said transmission comprising a system of gears axially movable on the countershaft having a grooved hub engaged by a member of said yoke, said system of gears being shiftable rearward by said yoke immediately after the clutch is disengaged so as to allow the selective gears to be shifted without meshing with other respective gears of said countershaft, and said system of gears being shiftable to their normal position by said yoke, immediately before the clutch engages, thereby meshing with any gear that may have been selected.

5. In an automobile transmission gear shift mechanism, the combination of a gear transmission, a clutch between the transmission and a source of power, a spring normally holding the clutch members in engagement, a hand-controlled member adapted to assume different positions, a shaft rotated thereby and a plurality of selecting cams on said shaft, each of said cams adapted to shift a corresponding gear, a countershaft, said transmission comprising a system of gears on said countershaft, a clutch pedal controlled member adapted to shift said system of gears, a disk having notches in its face, said disk being mounted on said cam carrying shaft, an arm adapted to engage the notches in the face of said disk, said arm being in operative connection with the clutch pedal controlled member, and the notches in the face of said disk being of such a depth that the gears on said countershaft are shifted rearward before said arm is disengaged from said disk thereby assuring the shifting of the selective gears without meshing with other respective gears on said countershaft.

CHASE DILLON SMELSER.

Witnesses:
Roy F. Brigeman,
Burr S. Balser.